US009215466B2

(12) United States Patent
Zhai et al.

(10) Patent No.: US 9,215,466 B2
(45) Date of Patent: Dec. 15, 2015

(54) JOINT FRAME RATE AND RESOLUTION ADAPTATION

(75) Inventors: Jiefu Zhai, San Jose, CA (US); Xiaosong Zhou, Campbell, CA (US); Hsi-Jung Wu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 553 days.

(21) Appl. No.: 13/018,298

(22) Filed: Jan. 31, 2011

(65) Prior Publication Data

US 2012/0195372 A1   Aug. 2, 2012

(51) Int. Cl.
*H04N 7/32* (2006.01)
*H04N 19/156* (2014.01)
*H04N 19/61* (2014.01)
*H04N 19/126* (2014.01)
*H04N 19/146* (2014.01)

(52) U.S. Cl.
CPC ........... *H04N 19/156* (2014.11); *H04N 19/126* (2014.11); *H04N 19/146* (2014.11); *H04N 19/61* (2014.11)

(58) Field of Classification Search
CPC .............................................. H04N 19/00169
USPC ..................................................... 375/240.03
See application file for complete search history.

(56) References Cited

U.S. PATENT DOCUMENTS

| 5,231,484 | A | * | 7/1993 | Gonzales | ............... | H04N 19/00 348/469 |
| 5,425,050 | A | * | 6/1995 | Schreiber et al. | ............. | 375/141 |
| 6,026,190 | A | * | 2/2000 | Astle | .................... | H04N 19/176 |
| 6,678,468 | B2 | | 1/2004 | Tatsumi et al. | | 375/E7.135 |
| 6,782,132 | B1 | * | 8/2004 | Fogg | ......................... | G06T 1/20 348/716 |
| 6,987,890 | B2 | * | 1/2006 | Joshi et al. | ..................... | 382/240 |
| 7,009,533 | B1 | * | 3/2006 | Wegener | ........................ | 341/76 |
| 7,177,358 | B2 | * | 2/2007 | Inomata | .............. | H04N 19/105 375/240.12 |
| 7,773,672 | B2 | | 8/2010 | Prieto et al. | | |
| 7,809,061 | B1 | | 10/2010 | Sarna | | |
| 8,510,458 | B2 | * | 8/2013 | Nassor et al. | ................. | 709/231 |
| 8,798,144 | B2 | * | 8/2014 | Lamy-Bergot et al. | .. | 375/240.07 |
| 2005/0175092 | A1 | * | 8/2005 | Puri et al. | ................. | 375/240.03 |
| 2006/0095401 | A1 | * | 5/2006 | Krikorian et al. | ................. | 707/1 |
| 2007/0025441 | A1 | * | 2/2007 | Ugur et al. | ............... | 375/240.03 |
| 2007/0036227 | A1 | * | 2/2007 | Ishtiaq | ................. | H04N 19/172 375/240.26 |
| 2009/0225170 | A1 | | 9/2009 | Yamagishi et al. | | |
| 2010/0189179 | A1 | | 7/2010 | Gu et al. | | |
| 2011/0164679 | A1 | * | 7/2011 | Satou | ................... | H04N 19/172 375/240.03 |

\* cited by examiner

*Primary Examiner* — William C Vaughn, Jr.
*Assistant Examiner* — Luis Perez Fuentes
(74) *Attorney, Agent, or Firm* — Kenyon & Kenyon LLP

(57) ABSTRACT

A video coder employs techniques for applying frame rate adaptation and variable resolution adaptation in response to environmental coding factors present at the coding terminal. According to such techniques, a coder may estimate a coding quality level to be applied based on the environmental coding factors. The coder may retrieve from a controller table, settings for resolution and frame rate based on the estimated quality level. Optionally, the coder further may retrieve settings identifying a range of quantization parameters that may be used during coding. Prior to coding, the coder may configure input video data to match the resolution and frame rate settings retrieved from the controller table. Thereafter, the coder may code the reconfigured input video data by motion-compensation prediction constrained, as applicable, by the retrieved quantization parameter range.

14 Claims, 4 Drawing Sheets

100

400

JOINT FRAME RATE AND RESOLUTION ADAPTATION

BACKGROUND

In video coder/decoder systems, a video encoder may code a source video sequence into a coded representation that has a smaller bit rate than does the source video and, thereby may achieve data compression. The encoder may code processed video data according to any of a variety of different coding techniques to achieve bandwidth compression. One common technique for data compression uses predictive coding techniques (e.g., temporal/motion predictive encoding). For example, some frames in a video stream may be coded independently (I-frames) and some other frames (e.g., P-frames or B-frames) may be coded using other frames as reference frames. P-frames may be coded with reference to a single previously coded frame (P-frame) and B-frames may be coded with reference to a pair of previously-coded frames, typically a frame that occurs prior to the B-frame in display order and another frame that occurs subsequently to the B-frame in display order. The resulting compressed sequence (bit stream) may be transmitted to a decoder via a channel. To recover the video data, the bit stream may be decompressed at the decoder, by inverting the coding processes performed by the encoder, yielding a received decoded video sequence. In some circumstances, the decoder may acknowledge received frames and report lost frames.

Modern coder/decoder systems often operate in processing environments in which the resources available for coding/decoding operations varies dynamically. Modern communications networks provide variable bandwidth channels to connect an encoder to a decoder. Further, processing resources available at an encoder or a decoder may be constrained by hardware limitations or power consumption objectives that limit the complexity of analytical operations that can be performed for coding or decoding operations. Accordingly, many modern coder/decoder systems employ a variety of techniques to constraint bandwidth consumption and/or conserve processing resources.

Frame Rate Adaptation ("FRA") is one such a technique used in video coding/decoding systems to manage bandwidth and/or resource consumption within the coder/decoder system. FRA is a technique that alters the number of frames in a video sequence prior to being coded for bandwidth conservation. For example, a camera may output video data to an encoder at a predetermined frame rate (say, 30 frames per second ("fps")) but an encoder may reduce this rate to a lower resolution (20 fps, 15 fps or 10 fps) to meet a performance constraint. Reducing the frame of the video sequence effectively reduces the data to be coded and, therefore, contributes to reduced bandwidth when the resulting video sequence is coded. Similarly, a reduced frame rate sequence also is less complex to code than a full frame rate image. When the reduced frame rate sequence is decoded, however, it generally is perceived subjectively as having lower quality than a decoded full rate sequence because the dropped frames cannot be recovered.

Video Resolution Adaptation ("VRA") is another technique used in video coding/decoding systems to manage bandwidth and/or resource consumption within the coder/decoder system. VRA is a technique that alters the resolution (or size) of images prior to being coded for bandwidth conservation. For example, a camera may output video data to an encoder at a predetermined resolution (say, 960×720 pixels) but an encoder may reduce this resolution to a lower resolution (ex., 320×240 pixels) to meet a performance constraint. Reducing the resolution of the image effectively reduces its size for coding and, therefore, contributes to reduced bandwidth when the resulting image is coded. Similarly, a reduced resolution image also is less complex to code than a full resolution image. When the reduced resolution frame is decoded, however, it generally is perceived subjectively as having lower quality than a decoded full resolution frame because the lost frame data generally cannot be recovered.

Management of quantization parameters provides a further technique used in video coding/decoding system to manage bandwidth and/or resource consumption within the coder/decoder system. Quantization generally involves applying a quantization parameter (often, "QP") as a divisor to transform coefficients. Quantization reduces the number of bits that must be used to represent high-energy coefficients. Quantization also can reduce many low-energy coefficients to zero, which contributes to high coding efficiency when the quantized coefficients later are entropy coded. Quantization contributes to data loss and, by extension, loss of image quality because the eliminated coefficients will not be recovered during decode operations. Thus, when applied to a common set of transform coefficients, relatively higher quantization parameters generally cause higher coding efficiency than lower quantization parameter but also generally cause lower image quality.

DETAILED DESCRIPTION

Embodiments of the present invention provide techniques for applying frame rate adaptation and variable resolution adaptation in response to environmental coding factors present at the coding terminal. According to such techniques, a coder may estimate a coding quality level to be applied based on the environmental coding factors. The coder may retrieve from a controller table, settings for resolution and frame rate based on the estimated quality level. Optionally, the coder further may retrieve settings identifying a range of quantization parameters that may be used during coding. Prior to coding, the coder may configure input video data to match the resolution and frame rate settings retrieved from the controller table. Thereafter, the coder may code the reconfigured input video data by motion-compensation prediction constrained, as applicable, by the retrieved quantization parameter range.

Figure 1:
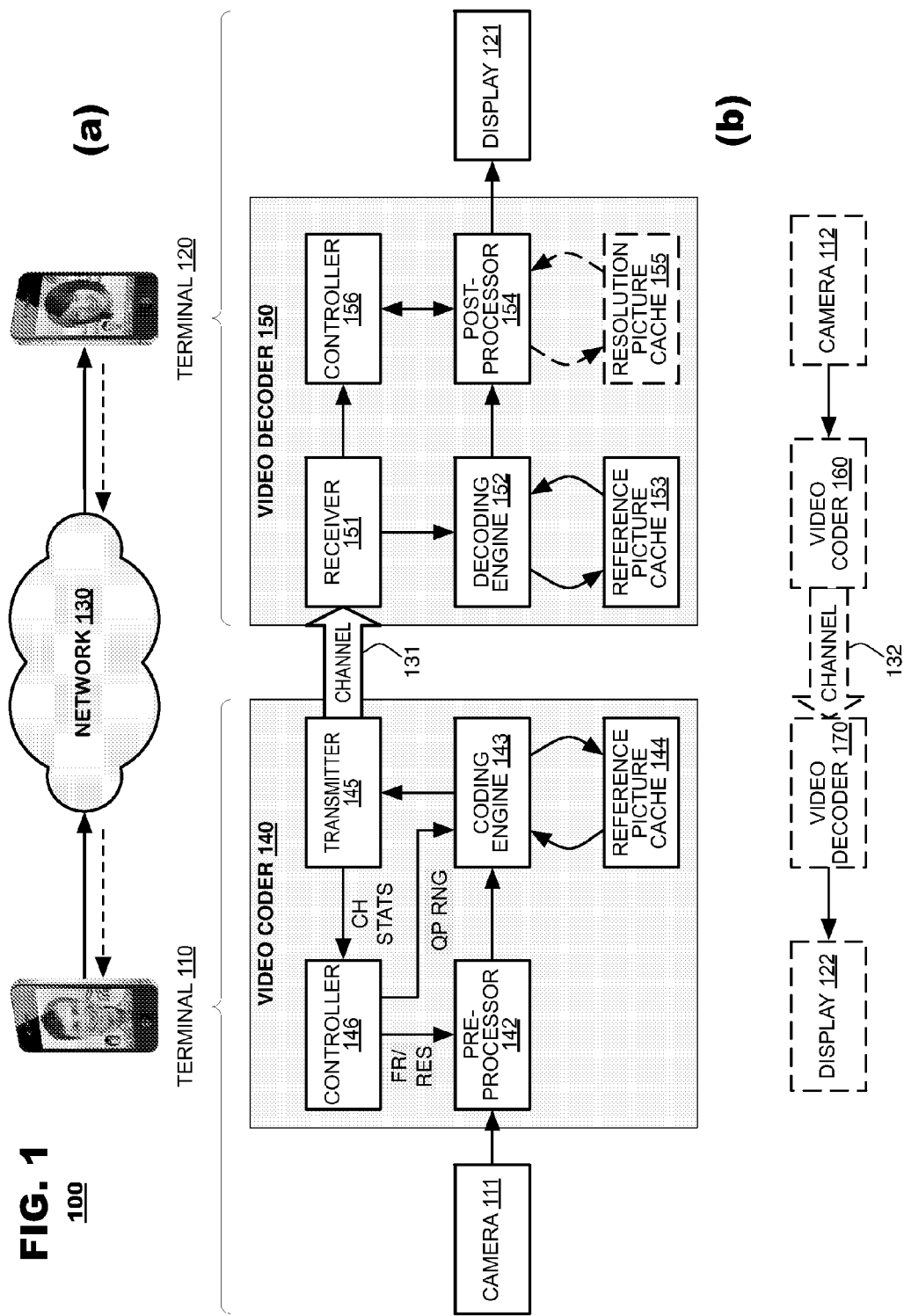
FIG. 1 illustrates a video coding system according to an embodiment of the present invention.

FIG. 1($a$) illustrates a simplified block diagram of a video coding system 100 according to an embodiment of the present invention. The system 100 may include a plurality of terminals 110, 120 interconnected via a network 130. The terminals 110, 120 each may capture video data at a local location and code the video data for transmission to the other terminal via the network 130. Each terminal 110, 120 may receive the coded video data of the other terminal from the network 130, decode the coded data and display video data recovered therefrom. As illustrated in FIG. 1($a$), the terminals 110, 120 are illustrated as smart phones but the principles of the present invention are not so limited. Embodiments of the present invention find application with personal computers (both desktop and laptop computers), tablet computers, computer servers, media players and/or dedicated video conferencing equipment. The network 130 represents any number of networks that convey coded video data between the terminals 110, 120, including for example wireline and/or wireless communication networks. The communication network 130 may exchange data in circuit-switched or packet-switched channels. Representative networks include telecommunications networks, local area networks, wide area networks and/or the Internet. For the purposes of the present discussion, the architecture and topology of the network 130 is immaterial to the operation of the present invention unless explained hereinbelow.

FIG. 1(b) further illustrates a functional block diagram of a video coder and decoder 140, 150 operable within the system 100. Specifically, FIG. 1 illustrates a video coder 140 for terminal 110 and a video decoder 150 for terminal 120. The video coder 140 may code video data captured at a camera 111 of terminal 110 and may deliver the coded data to a channel 131 provided by the network 130. The video decoder 150 may receive the coded video data from the channel 131, decode the coded video data and render the recovered video data at a display 121 of the second terminal 120. The functional blocks illustrated in FIG. 1 support video coding and deciding in one direction only. For bidirectional communication, terminal 120 may include functional blocks 160 for video coding of locally-captured video and terminal 110 may include functional blocks 170 for decoding of coded video data received from the terminal 120 via the network 130.

As illustrated, the video coder 140 may include a preprocessor 142, a coding engine 143, a reference picture cache 144 and a transmitter 145. The pre-processor 142 may accept source video from an image capture device 111 such as a camera and may perform various processing operations on the source video to condition it for coding. The coding engine 143 may perform bandwidth compression operations on the pre-processed source video to reduce spatial and/or temporal redundancies therein. The coding engine 143 may output coded video data to the transmitter 145, which may format the data for transmission over the channel 131 and delivery to the terminal 120. As part of its operation, the coding engine 143 also may code new frames of video data according to motion prediction techniques using data stored in the reference picture cache 144 as a prediction reference. The coding engine 143 further may decode coded video data of the reference frames for storage in the reference picture cache 144.

The video coder 140 may include a controller 146 to manage operation of the video coder 140. The controller 146 may select coding parameters that the preprocessor 142 and coding engine 143 are to use during coding. In the illustrated embodiment, the controller 146 may select a coding quality level to be used during coding, which may be represented by a selection of frame rate, frame resolution and range of quantization parameters to be used by the video coder 140. The controller 146 may select the quality level in response to environmental factor representing condition under which the video coder 140 is operating. For example, in one embodiment, the controller 146 may estimate its environmental coding conditions based on channel statistics representing network operating conditions. In another embodiment, the controller 146 may estimate environmental coding conditions based on resources available at the terminal 110, for example, CPU loading, and/or power consumption levels at the terminal 110. Still further, the controller 146 may estimate environmental coding conditions based on resources estimated to be available at the receiving terminal (terminal 120 in FIG. 1).

The controller 146 may output control data to the preprocessor 142 identifying a frame rate and/or frame resolution to be used during coding. In response, the preprocessor 142 may reconfigure data input to it from the camera 111 to match the constraints identified by the controller 146. The preprocessor 142 may drop frames or generate temporally interpolated frames to match a frame rate imposed by the controller 146. Further, the preprocessor 142 may scale the input data in to match a resolution identified by the controller 146. The preprocessor 142 may output the reconfigured video data to the coding engine 143.

The pre-processor 142 may perform a variety of other video processing operations on the source video output from the camera to condition the source video for coding. The pre-processor 142 may include an array of filters (not shown) such as de-noising filters, sharpening filters, smoothing filters, bilateral filters and the like that may be applied dynamically to the source video based on characteristics observed within the video. The pre-processor 142 may include its own controller (not shown) to review the source video data from the camera and select one or more of the filters for application. Typically, the pre-processor 142 conditions the source video data to render bandwidth compression more efficient or to preserve image quality in light of data losses that may be incurred as the coding engine 143 operates.

The coding engine 143 may code input video data according to a variety of different coding techniques to achieve bandwidth compression. The coding engine 143 may compress the images by a motion-compensated prediction. Frames of the input video may be assigned a coding type, such as intra-coding (I-coding), uni-directionally predictive coding (P-coding) or bi-directionally predictive coding (B-coding). The frames further may be parsed into a plurality of pixel blocks and may be coded by transform coding, quantization and entropy coding. Pixel blocks of P- and B-coded frames may be coded predictively, in which case, the coding engine may calculate motion vectors identifying pixel blocks of decoded frames stored in the reference picture cache 144 that serve as predictions of the pixel blocks being coded and may generate prediction residuals prior to engaging the transform coding. In an embodiment, the video encoder may operate according to coding protocols defined by ITU H.263, H.264 and the like.

The controller 146 may output a control command to the coding engine 143 identifying a range of quantization parameters to be used during video coding. Quantization generally involves applying a quantization parameter (often, "QP") as a divisor to transform coefficients. Quantization reduces the number of bits that must be used to represent high-energy coefficients. Quantization also can reduce many low-energy coefficients to zero, which contributes to high coding efficiency when the quantized coefficients later are entropy coded. Quantization contributes to data loss and, by extension, loss of image quality because the eliminated coefficients will not be recovered during decode operations. Thus, when applied to a common set of transform coefficients, relatively higher quantization parameters generally cause higher coding efficiency than lower quantization parameter but also generally cause lower image quality.

According to embodiments of the present invention, when the controller 146 identifies a QP range to the coding engine 143, the coding engine 143 may select quantization parameters autonomously based on its own control algorithms. Those algorithms typically select quantization parameters based on estimates of the complexity of input data, and an estimated bit rate that is supported by the channel 131. In this embodiment, the coding engine's 143 selection of a quantization parameter will not be valid unless it also falls within the range identified by the controller 146.

The transmitter 145 may transmit the coded video data to the channel 131. In so doing, the transmitter 145 may multiplex the coded video data with other data to be transmitted such as coded audio data and control data (provided by processing sources that are not illustrated in FIG. 1). The transmitter 145 may format the multiplexed data into a format appropriate for the network 130 and transmit the data to the network.

As part of its operation, the transmitter 145 may observe performance of the network and develop statistics on such performance. For example, the transmitter 145 may estimate the bandwidth of a channel 131 that the network 130 can provide to the terminal 110. In many networking applications, network channels provide variable data rates for transmission, which change without notice to the transmitting terminals. The transmitter 145 may receive indicators from the channel 131 or from the far-end terminal 120 identifying transmission failures, transmission latencies and other indicators of network performance from which the transmitter 145 may estimate network performance. The transmitter 145 may provide channel statistics to the controller 146. The controller 146, in turn, may alter its selection of coding parameters to match the bit rate of coded data output by the coding engine 143 to the estimated bandwidth of the channel 131.

The video decoder 150 may include a receiver 151, a decoding engine 152, a reference picture cache 153, a post-processor 154, a resolution picture cache 155 and a controller 157. The decoding engine 152 may decode coded video data received via the channel 131 with reference to reference pictures stored in the reference picture cache 153. The decoding engine 152 may output decoded video data to the post-processor 154, which may perform additional operations on the decoded video data to condition it for display. Decoded video data of reference frames also may be stored to the reference picture cache 153 for use during decoding of subsequently received coded video data. As part of its operation, the post-processor 154 may change resolution of low resolution frames using stored pictures in the resolution picture cache 155 as a basis for correction, as discussed below.

The decoding engine 152 may perform decoding operations that invert coding operations performed by the coding engine 143. The decoding engine 152 may perform entropy decoding, dequantization and transform decoding to generate recovered pixel block data. Quantization/dequantization operations are lossy processes and, therefore, the recovered pixel block data likely will be a replica of the source pixel blocks that were coded by the video encoder 140 but include some error. For pixel blocks coded predictively, the transform decoding may generate residual data; the decoding engine 152 may use motion vectors associated with the pixel blocks (which may be implied in some cases) to retrieve predicted pixel blocks from the reference picture cache 153 to be combined with the prediction residuals. Decoded pixel blocks may be reassembled into frames and output to the post-processor 154.

In an embodiment of the present invention, the post-processor 154 may increase resolution of decoded low-resolution frames by using prior decoded high reference frames as bases for correction. Prior to rendering of a decoded low-resolution frame, the decoder may perform motion estimation analyses between the low-resolution frame and previously decoded high-resolution frames. If the motion estimation analysis identifies a match between the low-resolution frame and one or more high-resolution frames, the post-processor 154 may generate an upsampled version of the low-resolution frame with reference to the matching portions of the high-resolution frames. The high-resolution version of the low-resolution frame likely will have higher image quality than would be achieved by other techniques.

The post-processor 154 may perform additional video processing to condition the recovered video data for rendering, commonly at a display device. Typical post-processing operations may include applying deblocking filters, edge detection filters, ringing filters and the like. The post-processor 154 may output recovered video sequence from rendering on the display 121 or, optionally, stored to memory for later retrieval and display.

As discussed, the camera 111, video coder 140, video decoder 150 and display 121 support delivery of video data in only one direction, from terminal 110 to terminal 120. The principles of the present invention may be extended to bidirectional exchange of video data, in which case these functional blocks may be replicated to support delivery of video data from terminal 120 to terminal 110. Thus, the terminal 120 may include its own camera 112 and video coder 160 and the terminal 110 may include a video decoder 170 and display 122. Although not illustrated in FIG. 1(*b*), the video coder 160 and video decoder 170 may be provisioned similarly to their counterparts in the first direction—the video coder 140 and video decoder 150. Thus, the video coder 160 may selectively change resolution of video data output from the camera prior to being coded and the vide decoder 170 may recover high resolution content for decoded low resolution frames as discussed herein. Although similarly provisioned, the video encoder/decoder pairs (140/150 and 160/170) may operate independently of each other. Therefore, pre-processing operations 142 and post-processing operations 154 of a first video encoder/decoder pair 140/150 may be selected dynamically with regard to the video content being processed by that pair. Pre-processing operations and post-processing operations of the second video encoder/decoder pair 160/170 may be selected dynamically with regard to the video content being processed by the second pair and without regard to the video content being processed by the first pair 140/150. Thus, any resolution control of the first coder 140 may be performed independently of resolution control of the second coder 160.

Figure 2:
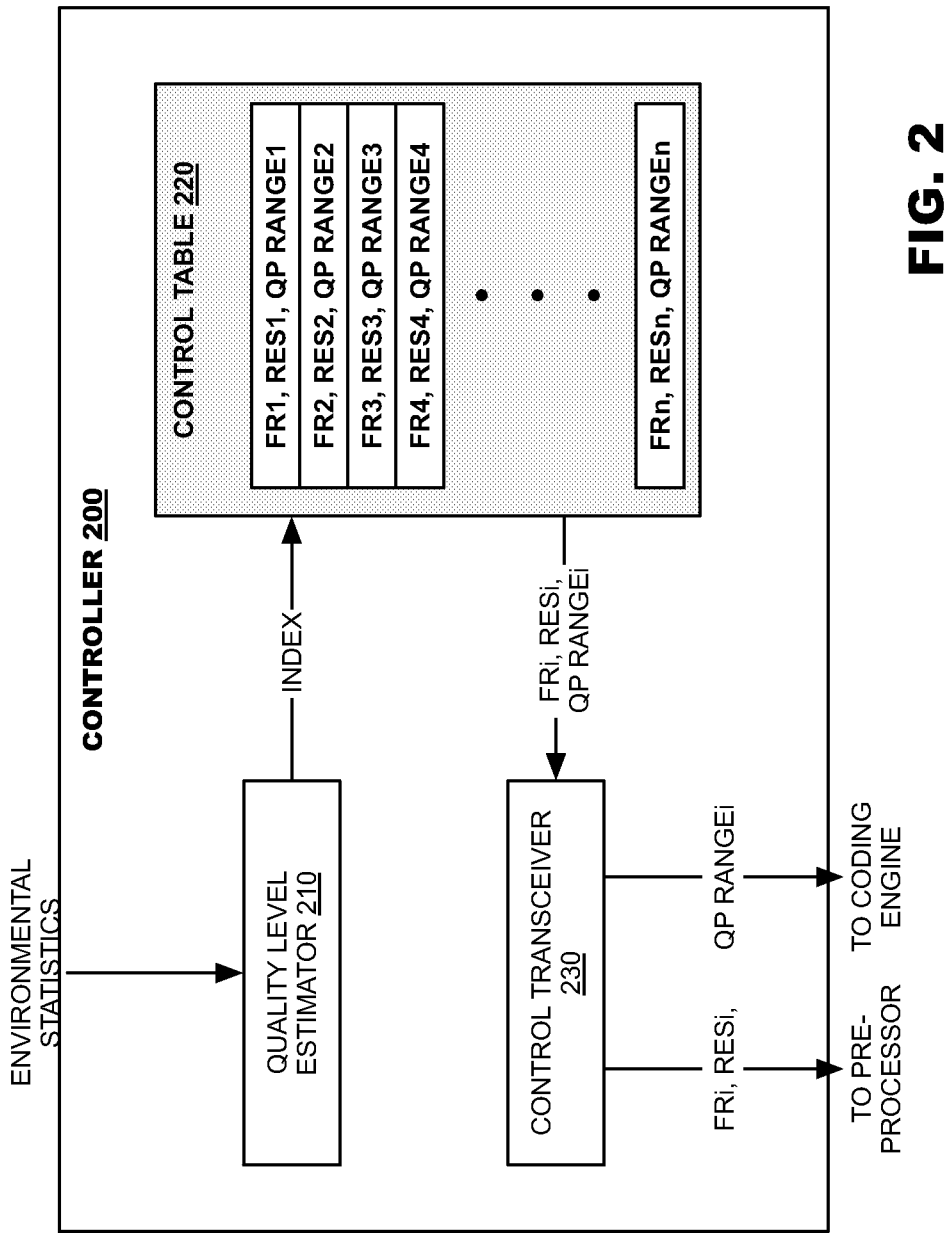
FIG. 2 is a functional block diagram of a controller according to an embodiment of the present invention.

FIG. 2 is a functional block diagram of a controller 200 as it relates to selection of coding parameters. As illustrated, the controller 200 may include a quality level estimator 210, a control table 220 and a controller transceiver 230. The quality level estimator 210 may receive environmental statistics data from various elements of the terminal (not shown) from which the coding quality level may be determined. As indicated, the environmental statistics data may include data representing network conditions of the channel, identifying, for example, channel bandwidth, channel error rates, transmission latencies and other artifacts. The environmental statistics data further may include data representing processing resources available (for example, CPU loading indicators) and/or power resources (for example, battery level) available at the local terminal. The environmental statistics also may include data representing processing resources and/or power resources available at the far-end terminal 120 (FIG. 1), which will receive and decode coded video data from the video coder 140. The far-end terminal data may be generated in response to transmissions from the far-end terminal expressly identifying such resources. Alternatively, the far-end terminal data may be derived based on local data identifying a type of device present as the far-end terminal (for example, whether the far-end terminal is a media player with relatively limited processing power or whether it is a personal computer with higher processing capabilities). Based on one or more of these types of data, the controller 200 may derive a coding level to be used during coding.

The control table 220 may include a variety of entries each storing data representing a frame rate selection, a frame resolution selection and a range of quantization parameters to be used during coding. Each entry may be identified by a respective index, which may be supplied by the quality level estimator and provided to the control table 220. That is, the quality level estimator 210 may derive a coding level to be used during coding which may be applied to the control table 220 as an index. In response to the coding level, the control table 220 may output the associated set of frame rate, frame resolution and QP range data to the controller transceiver 230. The controller transceiver 230 may transmit the data to the pre-processor 142 and coding engine 143 (FIG. 1).

The controller 200 may operate continuously during coding operations, continually receiving updated values representing environmental conditions and deriving coding quality levels therefrom. The controller 200 may retrieve updated values of frame rate, frame resolution and QP range data from the control table 220 and output them to the pre-processor 142 and coding engine 143 (FIG. 1).

Use of the control table 220 allows system designers to designate an array of coding parameters to be used and correlate them to predetermined coding quality levels. During operation, the environmental coding conditions are resolved into uni-dimensional indicator of coding quality level that is to be applied during coding. The coding quality level, therefore, may be considered as moving along a line from a high quality coding state to a low quality coding state. As discussed, it can be difficult to design a single control algorithm that harmonizes tradeoffs between multiple frame rates, frame resolutions and quantization parameters. The controller 200 of FIG. 2 allows the tradeoffs to be modeled in the control table 220, which can retrieve and apply a desired set of coding parameter data upon calculation of a quality level.

Table 1 illustrates an exemplary set of control parameters that may be stored in a six-entry control table 220. As illustrated, a first entry may be associated with a highest coding quality level and stores comparatively high resolution, frame rate and QP range data. The second and third entries (coding levels 4 and 3) have different resolution levels but the same frame rate values. Thus, in this example, system designers elected to maintain frame rate at the expense of resolution to maintain coding quality. The final two entries (coding levels 1 and 0) have common resolution values but different frame rate values.

TABLE 1

| CODING QUALITY LEVEL | RESOLUTION (PIXELS) | FRAME RATE (FPS) | ACCEPTABLE QP RANGE |
| --- | --- | --- | --- |
| 5 | 1280 × 720 | 30 | 25~35 |
| 4 | 960 × 540 | 20 | 25~33 |
| 3 | 640 × 480 | 20 | 25~33 |
| 2 | 480 × 320 | 15 | 25~33 |
| 1 | 320 × 240 | 10 | 25~33 |
| 0 | 320 × 240 | 5 | 25~33 |

The values illustrated in Table 1 are merely exemplary. In practice, coding tables may have different data values, which may be tailored for different coding applications. Further, as noted, the tables themselves may have more entries than illustrated, for example, 20-25 entries.

Figure 3:
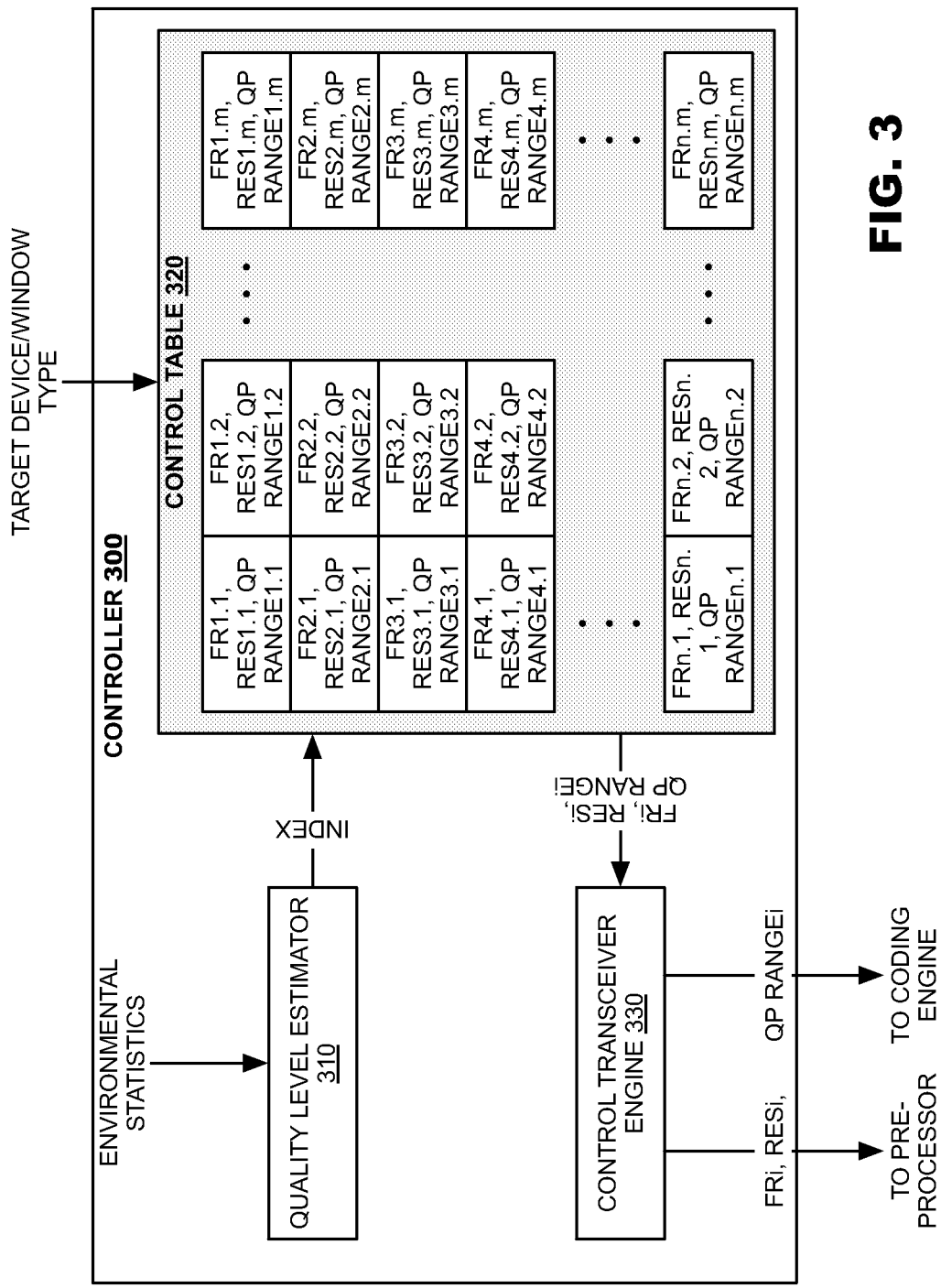
FIG. 3 illustrates a controller according to another embodiment of the present invention.

FIG. 3 illustrates a controller 300 according to another embodiment of the present invention. In this embodiment, the controller 300 also may include a quality level estimator 310, a control table 320 and a control transceiver 330. The quality level estimator 310 may receive environmental statistics data from various elements of the terminal (not shown) from which the coding quality level may be determined. As indicated, the environmental statistics data may include data representing network conditions of the channel, identifying, for example, channel bandwidth, channel error rates, transmission latencies and other artifacts. The environmental statistics data further may include data representing processing resources available (for example, CPU loading indicators) and/or power resources (for example, battery level) available at the local terminal. The environmental statistics also may include data representing processing resources and/or power resources available at the far-end terminal 120 (FIG. 1), which will receive and decode coded video data from the video coder 140. The far-end terminal data may be generated in response to transmissions from the far-end terminal expressly identifying such resources. Alternatively, the far-end terminal data may be derived based on local data identifying a type of device present as the far-end terminal (for example, whether the far-end terminal is a media player with relatively limited processing power or whether it is a personal computer with higher processing capabilities). Based on one or more of these types of data, the controller 300 may derive a coding level to be used during coding.

The control table 320 may include a variety of entries each storing data representing a frame rate selection, a frame resolution selection and a range of quantization parameters to be used during coding. In this embodiment, the table 320 may have a two-dimensional array of entries. A first dimension of the table 320 may be selected based on a coding quality index, which may be supplied by the quality level estimator and provided to the control table 320. A second dimension of the table 320 may be selected based on an estimated size of a target window for which video data is being coded. In the system illustrated in FIG. 1, the controller of terminal 110 may estimate a display window at terminal 120 that will display the decoded video. In response to the coding level index and the target window identifier, the control table 320 may output the associated set of frame rate, frame resolution and QP range data to the controller transceiver 330. The controller transceiver 330 may transmit the data to the pre-processor 142 and coding engine 143 (FIG. 1).

The embodiment of FIG. 3 allows system designers to program different quality tradeoffs into the controller 300 for different devices types or different display sizes. For example, handheld media players and smart phones often have relatively small display sizes—often 3½ inches in diagonal or smaller. For smaller screens, viewers may perceive higher decoding quality is maintained in adverse coding conditions if frame rate is maintained at a relatively high rate even if resolution is lowered or quantization parameters are increased. By contrast, laptop or desktop computers have relatively larger display sizes—often 10-19 inches in diameter. For larger screen sizes, viewers may perceive that higher coding quality is maintained in adverse coding conditions if frame resolution is maintained at a relatively high level even if frame rate is lowered or quantization parameters are increased. A multi-dimensional control table 300 allows system designers to program different trade offs between quantization parameters, frame rate and frame resolution for different target devices. Indeed, in one embodiment, the target window size is represented by a device type rather than a direct representation of the size of display window.

In another embodiment, the target window size may be an express indicator of a display window. In this embodiment, the controller table 320 may be indifferent to device type. Thus, if a smart phone and a laptop computer both generate display windows of a common size (for example, 960×640 pixels) and operate under circumstances that yield a common quality index, the controller 300 would retrieve the same set of coding parameters from the control table 320.

Figure 4:
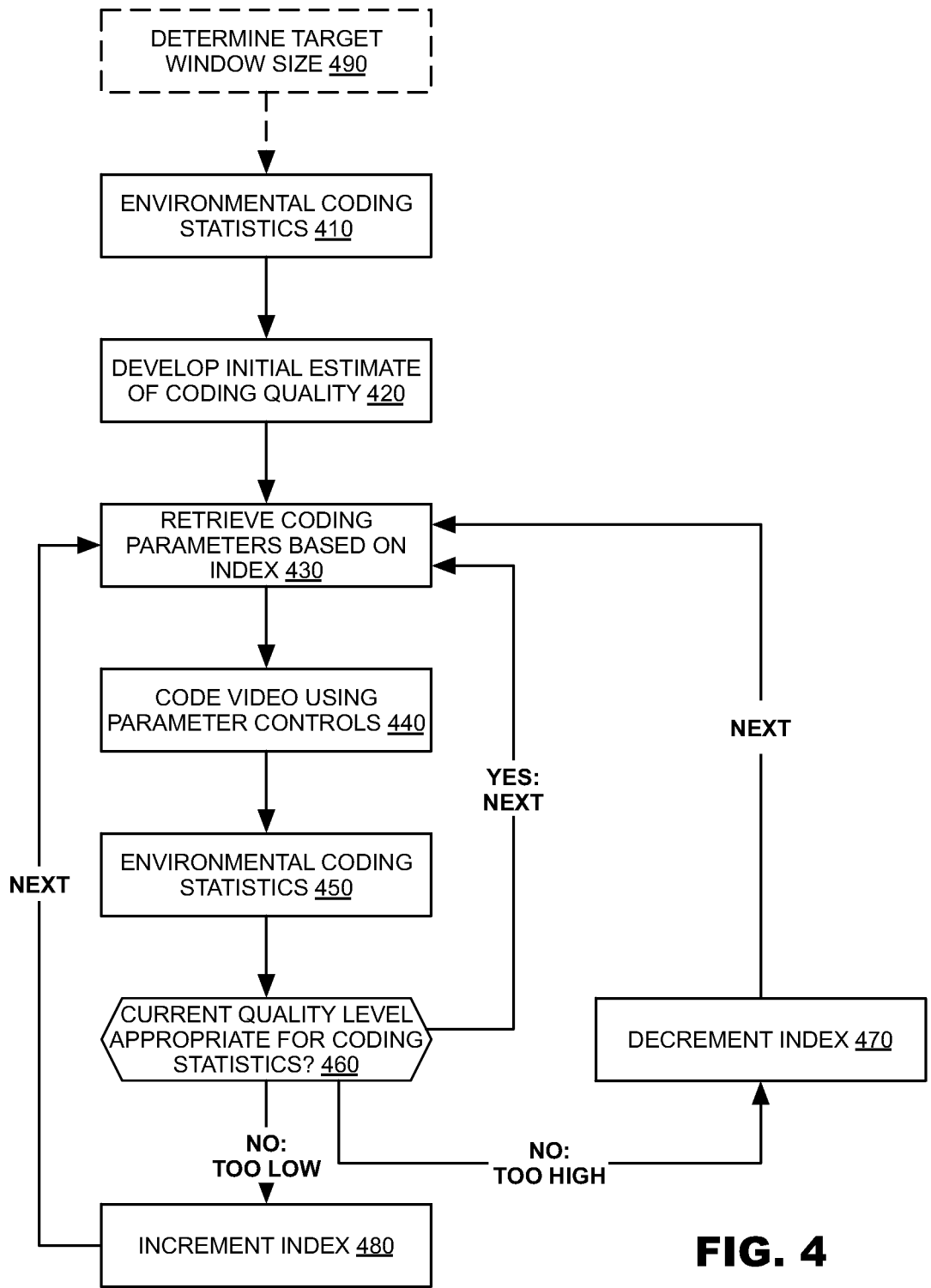
FIG. 4 illustrates a method according to an embodiment of the present invention.

FIG. 4 illustrates a method 400 according to an embodiment of the present invention.

The method 400 may begin with evaluation of environmental resource statistics (box 410). From the statistics, the method 400 may generate an initial estimate of coding quality (box 420) and may retrieve coding parameters from a look up table using the estimated coding quality as an index (box 430). Video coding may begin using the initial set of coding parameters retrieved from the lookup table (box 440).

Thereafter, the method 400 may continue to evaluate the environmental coding statistics (box 450) and determine whether the current quality level is appropriate for the coding statistics (box 460). If so, the method 400 may continue to use the present set of coding parameters as a coding constraint for the video coder (shown as reversion back to box 430). If not, however, the method may alter the index used into the look up table. If the coding quality level is too high, the method 400 may revise the index by a step in a first direction to lower the coding quality, shown as decrementing the index in FIG. 4 (box 470). If the coding quality level is too low, the method 400 may revise the index by a step in an opposite direction to raise the coding quality, shown as incrementing the index in FIG. 4 (box 480). Following operation at boxes 470 or 480, the method may return to box 430, retrieve a new set of coding parameters and apply them in further video coding.

The method of FIG. 4 finds application with the controller tables of FIG. 2 or 3. Therefore, the method 400 may be tailored to operate in an environment with a two-dimensional look up table indexed also by target window size and, in such an embodiment, the method may determine the target window size as a preliminary step (box 490) and apply the window size as part of the index provided to the look up table at box 430. Moreover, if the target window size changes over time, as may occur if a user at a far end terminal increases or decreases the spatial area of a display window, and if the new size is reported to the near end terminal, the method 400 may revise its determination of the target window size (step not shown).

In the embodiment of FIG. 4, during runtime operation of the video coder, the determination of whether the current quality level is appropriate for coding statistics allows system designers to program latencies into the transition between quality levels. Thus, the estimation of quality levels during operation of box 420 may proceed slightly differently than the estimation of quality levels during operation of boxes 450-460. During operation of box 420, the controller may determine what quality level is most appropriate for the input video data based on the environmental resource statistics available. At this stage, the quality levels may be associated with non-overlapping sets of environmental resource statistics. During operation of boxes 450-460, the controller may determine whether a current quality level is appropriate for the video, which allows for some overlap between the quality levels and the environmental resource statistics. In this manner, the system should not toggle erratically between two sets of coding parameter when environmental resource statistics vary between two different quality levels.

The foregoing discussion identifies functional blocks that may be used in video coding systems constructed according to various embodiments of the present invention. In practice, these systems may be applied in a variety of devices, such as mobile devices provided with integrated video cameras (e.g., camera-enabled phones, entertainment systems and computers) and/or wired communication systems such as videoconferencing equipment and camera-enabled desktop computers. In some applications, the functional blocks described hereinabove may be provided as elements of an integrated software system, in which the blocks may be provided as separate elements of a computer program. In other applications, the functional blocks may be provided as discrete circuit components of a processing system, such as functional units within a digital signal processor or application-specific integrated circuit. Still other applications of the present invention may be embodied as a hybrid system of dedicated hardware and software components. Moreover, the functional blocks described herein need not be provided as separate units. For example, although FIG. 1 illustrates the components of video coders and decoders as separate units, in one or more embodiments, some or all of them may be integrated and they need not be separate units. Such implementation details are immaterial to the operation of the present invention unless otherwise noted above.

Further, the figures illustrated herein have provided only so much detail as necessary to present the subject matter of the present invention. In practice, video coders and decoders typically will include functional units in addition to those described herein, including buffers to store data throughout the coding pipelines illustrated and communication transceivers to manage communication with the communication network and the counterpart coder/decoder device. Such elements have been omitted from the foregoing discussion for clarity.

Several embodiments of the invention are specifically illustrated and/or described herein. However, it will be appreciated that modifications and variations of the invention are covered by the above teachings and within the purview of the appended claims without departing from the spirit and intended scope of the invention.

We claim:

1. A video coding method, comprising:
   at a video coding system, during pre-processing and prior to coding, selecting a coding quality level to be applied to input video based on indicators representing resources of a device in which the video coding system operates,
   during pre-processing and prior to coding, retrieving from a controller table, first settings for resolution, QP range, and frame rate using the selected quality level as an index to the table, wherein the table stores entries of coding parameters that are associated with a plurality of predetermined potential quality levels,
   during pre-processing and prior to coding, transmitting resolution, QP range, and frame rate first settings data retrieved from the controller table to a pre-processor;
   during pre-processing and prior to coding, configuring input video data to match the resolution and frame rate settings retrieved from the controller table, said reconfiguring including dropping or interpolating frames from an input sequence of video data to meet the retrieved frame rate setting and scaling the video data to meet the resolution settings,
   coding the reconfigured input video data by motion-compensation prediction using quantization parameters within the QP range, upon receiving updated indicators representing resources of the device, determining whether the quality level of the coded video is appropriate for the updated indicators, if the quality level of the coded video is appropriate for encoding input video based on the updated indicators, using the first settings for configuring and coding subsequent input video, if the quality level is not appropriate for encoding input video based on the updated indicators:
   incrementing or decrementing the index to the controller table to reflect a more appropriate quality level, and
   retrieving from the controller table new settings for configuring and coding subsequent input video, using the revised index.

2. The method of claim 1, further comprising:
revising the estimated coding quality level to be applied based on the updated indicators,
retrieving from the controller table, new settings for resolution and frame rate based on the new estimated quality level,
configuring input video data to match the new resolution and frame rate settings retrieved from the controller table, and
coding the reconfigured input video data by motion-compensation prediction.

3. The method of claim 2, further comprising:
retrieving from the controller table, settings for a range of quantization parameters to be used based on the new estimated quality level,
subsequently coding the configured input video data by motion-compensation prediction using quantization parameters within the range.

4. A video coding system, comprising:
a pre-processor to configure input video data according to input resolution and frame rate settings data prior to coding by a coding engine, said configuring including dropping or interpolating frames from the input video data to meet the input frame rate settings and scaling the input video data to meet the input resolution settings,
a controller, responsive to data representing resources of the video coding system, comprising:
   a coding quality estimator having an input for data representing an operating condition of the video coding system, and to select a coding quality level based on the received data,
   a controller table having indexable storage for resolution, QP range, and frame rate settings data, wherein a plurality of settings data are associated with a plurality of potential quality levels, and
   a transmitter to transmit first settings data retrieved from the controller table using the estimated quality level as an index to the pre-processor;
   wherein, upon receiving updated data representing an operating condition of the video coding system, the controller determines if the quality level of coded video is appropriate for the updated data and if the quality level of the coded video is appropriate, the first settings data is used by the pre-processor for configuring and coding subsequent input video, and if the quality level of the coded video is not appropriate, the controller increments or decrements the index to the controller table to reflect a more appropriate quality level and the transmitter transmits new settings data retrieved from the controller table using the adjusted index, to the pre-processor, and a coding engine to code video data according to motion compensation prediction using quantization parameters within the QP range.

5. The video coder of claim 4, wherein the controller:
revises the estimated coding quality level to be applied based on the updated data representing an operating condition of the video coding system,
retrieves from the controller table, new settings for resolution and frame rate based on the new estimated quality level,
configures input video data to match the new resolution and frame rate settings retrieved from the controller table, and
codes the reconfigured input video data by motion-compensation prediction.

6. The video coder of claim 5, wherein the controller:
retrieves from the controller table, settings for a range of quantization parameters to be used based on the new estimated quality level,
subsequently codes the configured input video data by motion-compensation prediction using quantization parameters within the range.

7. A video coding system, comprising:
a pre-processor to configure input video data according to input resolution and frame rate settings data prior to coding by the coding engine, said configuring including dropping or interpolating frames from the input video data to meet the input frame rate settings and scaling the input video data to meet the input resolution settings,
a controller, responsive to data representing resources of the video coding system, comprising:
   a coding quality estimator having an input for environmental coding factor data representing an operating condition of the video coding system, and to select a coding quality level based on the received data,
   a controller table having storage for resolution, QP range, and frame rate settings data, table entries being indexed by the quality level value and a display size value, and
   a transmitter to transmit resolution and frame rate settings data retrieved from the controller table using the estimated quality level as an index to the pre-processor,
   wherein, upon receiving updated data representing an operating condition of the video coding system, the controller determines if the quality level is appropriate for the updated data and if the quality level is appropriate, the first settings data is used by the pre-processor for configuring and coding subsequent input video, and if the quality level is not appropriate, the controller increments or decrements the index to the controller table to reflect a more appropriate quality level and the transmitter transmits new settings data retrieved from the controller table using the adjusted index, to the pre-processor, and
a coding engine to code video data according to motion compensation prediction using quantization parameters within the QP range.

8. The video coder of claim 7, wherein the display size values are derived from a size of a display screen of a target device.

9. The video coder of claim 7, wherein the display size values are derived from a size of a display window of a target device.

10. The video coder of claim 7, wherein the controller:
revises the estimated coding quality level to be applied based on the updated data, retrieves from the controller table, new settings for resolution and frame rate based on the new estimated quality level, configures input video data to match the new resolution and frame rate settings retrieved from the controller table, and codes the reconfigured input video data by motion-compensation prediction.

11. The video coder of claim 10, wherein the controller:

retrieves from the controller table, settings for a range of quantization parameters to be used based on the new estimated quality level, subsequently codes the configured input video data by motion-compensation prediction using quantization parameters within the range.

12. A non-transitory computer readable medium storing program instructions that, when executed by a processor, cause the processor to:

at a video coding system, during preprocessing and prior to coding, select a coding quality level to be applied to input video based on indicators representing resources of a device in which the video coding system operates, during preprocessing and prior to coding, retrieve from a controller table, settings for resolution and frame using the selected quality level as an index to the table, wherein the table stores entries of coding parameters that are associated with a plurality of predetermined potential quality levels, during pre-processing and prior to coding, transmit resolution and frame rate settings data retrieved from the controller table to a pre-processor;

during pre-processing and prior to coding, configure input video data to match the resolution and frame rate settings retrieved from the controller table, said configuring including dropping or interpolating frames from an input sequence of video data to meet the retrieved frame rate setting and scaling the video data to meet the resolution settings, and code the reconfigured input video data by motion-compensation prediction using quantization parameters within the QP range, upon receiving updated indicators representing resources of the device, determining whether the quality level of the coded video is appropriate for the updated indicators, if the quality level of the coded video is appropriate for encoding input video based on the updated indicators, using the first settings for configuring and coding subsequent input video, if the quality level is not appropriate for encoding input video based on the updated indicators:

incrementing or decrementing the index to the controller table to reflect a more appropriate quality level, and retrieving from the controller table new settings for configuring and coding subsequent input video, using the revised index.

13. The medium of claim 12, wherein the instructions further cause the processor to:

revise the estimated coding quality level to be applied based on the updated indicators, retrieve from the controller table, new settings for resolution and frame rate based on the new estimated quality level, configure input video data to match the new resolution and frame rate settings retrieved from the controller table, and code the reconfigured input video data by motion-compensation prediction.

14. The medium of claim 13, wherein the instructions further cause the processor to:

retrieve from the controller table, settings for a range of quantization parameters to be used based on the new estimated quality level, subsequently code the configured input video data by motion-compensation prediction using quantization parameters within the range.

* * * * *